United States Patent
Fujiwara et al.

(10) Patent No.: US 7,432,923 B2
(45) Date of Patent: Oct. 7, 2008

(54) POSITION MEASURING METHOD AND MOBILE COMMUNICATION TERMINAL

(75) Inventors: Masanori Fujiwara, Tokyo (JP); Satoshi Miyata, Tokyo (JP); Seiichi Kawakami, Tokyo (JP); Jun Sakamoto, Tokyo (JP); Kazuya Kawakami, Tokyo (JP); Atsushi Wada, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 0 days.

(21) Appl. No.: 11/650,476

(22) Filed: Jan. 8, 2007

(65) Prior Publication Data

US 2007/0109186 A1    May 17, 2007

Related U.S. Application Data

(63) Continuation of application No. PCT/JP2005/012670, filed on Jul. 8, 2005.

(30) Foreign Application Priority Data

Jul. 9, 2004    (JP) .............................. 2004-203194

(51) Int. Cl.
    *G01S 5/14* (2006.01)
(52) U.S. Cl. .............................. 345/357.09; 342/357.1; 342/357.15
(58) Field of Classification Search ............ 342/357.09, 342/357.1, 357.15
    See application file for complete search history.

(56) References Cited

U.S. PATENT DOCUMENTS 5,663,734 A * 9/1997 Krasner ................. 342/357.12
6,389,291 B1   5/2002 Pande et al.
6,427,120 B1   7/2002 Garin et al.
6,449,486 B1 * 9/2002 Rao ........................ 455/456.1

(Continued)

FOREIGN PATENT DOCUMENTS

EP    1 316 228 B1    6/2003

(Continued)

OTHER PUBLICATIONS

English Translation of JP 2005-86629 A.*

*Primary Examiner*—Thomas H. Tarcza
*Assistant Examiner*—Fred H. Mull
(74) *Attorney, Agent, or Firm*—Kratz, Quintos & Hanson, LLP.

(57) ABSTRACT

When a user of a mobile communication terminal makes a request for a position-measuring of a current location, at step S101, a position-measuring method determining section checks a position-measuring method specified. When the method specified is a "cell ID position-measuring", and it is performed, when the method specified is a "base station radio waves position-measuring"; a base station radio waves position-measuring is performed, when the method specified is a "GPS position-measuring" or a "not specified", at step S102, a judgment of whether an area in which the mobile communication terminal exist is an area suitable for data communication is made. When the judgment is negative, an autonomous GPS position-measuring is performed. When the judgment is affirmative, an assisted GPS position-measuring is performed. In this case, when the assisted GPS position-measuring has failed, in process to deal with failure of assisted GPS position-measuring at step S108, in a case of predetermined conditions, further the autonomous GPS position-measuring or a supplementary cell ID position-measuring is performed.

10 Claims, 7 Drawing Sheets

U.S. PATENT DOCUMENTS

| | | |
|---|---|---|
| 6,684,158 B1 | 1/2004 | Garin et al. |
| 6,768,909 B1 * | 7/2004 | Irvin ........................ 455/456.1 |
| 2002/0019698 A1 * | 2/2002 | Vilppula et al. ........ 342/357.08 |
| 2002/0086684 A1 | 7/2002 | Pande et al. |
| 2002/0116124 A1 | 8/2002 | Garin et al. |
| 2002/0145560 A1 | 10/2002 | Tsujimoto et al. |
| 2002/0183076 A1 | 12/2002 | Pande et al. |
| 2005/0060089 A1 | 3/2005 | Garin et al. |
| 2005/0062643 A1 | 3/2005 | Pande et al. |
| 2005/0206559 A1 * | 9/2005 | Diggelen et al. ....... 342/357.06 |
| 2007/0100549 A1 * | 5/2007 | Kawakami et al. .......... 701/214 |

FOREIGN PATENT DOCUMENTS

| | | |
|---|---|---|
| JP | 2002-196063 | 7/2002 |
| JP | 2002-300652 | 10/2002 |
| JP | 2004-507186 | 3/2004 |
| JP | 2005-086629 A * | 3/2005 |
| WO | 02-303665 | 10/2002 |
| WO | WO 02/082120 A1 | 10/2002 |
| WO | WO 03/100454 A1 | 12/2003 |

* cited by examiner

POSITION MEASURING METHOD AND MOBILE COMMUNICATION TERMINAL

RELATED APPLICATION

This is a continuation application of the international patent Application No. PCT/JP2005/012670 filed with Application date: Jul. 8, 2005. The present application is based on, and claims priority from, J.P. Application 2004-203194, filed on Jul. 9, 2004, the disclosure of which is hereby incorporated by reference herein its entirety.

BACKGROUND OF THE INVENTION

The present invention relates to a method for position measuring and a mobile communication terminal, and particularly to a method for position measuring in which a position of a current location of a mobile communication terminal is measured, and a mobile communication terminal which uses this method for position measuring.

BACKGROUND ART

Mobile communication terminals such as a cellular phone have been hitherto used widely. There has been a remarkable development in functions and performance of the mobile communication terminals. Mobile communication terminals which have a position measuring function which measures a current location of the mobile communication terminal, in addition to essential functions as a mobile communication terminal, such as a call function and an E-mail transceiving function, have been making debut.

A general example of a position measuring in the mobile communication terminals is a position measuring in which a GPS (Global Positioning System) satellite is used. An example of the position measuring in which the GPS satellite is used, is an autonomous GPS position measuring in which a GPS satellite is captured by it's own by performing a search of the entire sky, and the current location is calculated, as in a car navigation system in automobiles (refer to Patent Literature 1).

Moreover, an assisted GPS position measuring in which it is possible to capture a GPS satellite even without performing by it's own the search of the entire sky, by acquiring information for capturing (assistance information) of a GPS satellite from a location information server which is connected to a network, has been used practically (refer to Patent Literature 2).

Furthermore, as a position measuring in which the GPS satellite is not used, an ID position measuring in which, location information of a cell in a range of which the mobile communication terminal exists, is used. The cell ID position measuring although doesn't have a high position measuring accuracy as in the position measuring in which the GPS satellite is used, it is used as a supplementary position measuring, as the position measuring is possible even at a place where a GPS satellite cannot be captured, but a data communication can be performed.

Among these position measuring methods, in the autonomous GPS position measuring since the data communication does not occur as compared to the assisted GPS position measuring, there is no charge due to this, and it is a low cost method for position measuring. However, since a time taken for position measuring is too long, in a mobile communication terminal where emphasis is on a response, cases in which an assisted GPS position measuring having a higher accuracy and a shorter position measuring time have been used on a priority basis.

Patent Literature 1: Japanese Patent Application Laid-open Publication No. Hei 10-282205
Patent Literature 2: Japanese Patent Application Laid-open Publication No. 2002-196063

SUMMARY OF THE INVENTION

An assisted GPS position measuring in which the abovementioned location information server is used has an advantage that a time taken for position measuring is short. However, since it is necessary to perform a data communication for acquiring information for capturing, a burden of a communication charge is laid on a user. Furthermore, there has also been a disadvantage that the GPS position measuring cannot be performed in an area where the data communication is not possible.

Moreover, in a case of performing actual position measuring, according to an application of a side which uses a position measuring result, sometimes an accuracy of a cell ID is sufficient, and sometimes the position measuring time of an autonomous GPS position measuring is sufficient for serving the purpose, and irrespective of the application, performing the assisted GPS position measuring could not be considered to be an efficient method for position measuring. Moreover, according to an application of a side which uses the position measuring result, even in a case when the position measuring by the first position measuring method has failed, sometimes a position measuring result was sought to be acquired by a position measuring by another method for position measuring having a comparatively higher accuracy.

The present invention is made in view of the abovementioned circumstances, and it is an object of the present invention to provide a method for position measuring in which it is possible to select a position measuring method, and to select a position measuring by still another position measuring method, when the position measuring by that selected position measuring method has failed, and a mobile communication terminal which uses this method for position measuring.

The present invention, from a first viewpoint, is a method for position measuring which measures a current location at which a mobile communication terminal exists, comprising steps of, determining GPS position measuring at which one of an assisted GPS position measuring which is a position measuring in which assistance information which includes information for capturing a GPS satellite is used, and in which the assistance information when necessary, is acquired from a location information server which holds the assistance information, and an autonomous GPS position measuring which is a position measuring in which a GPS satellite which does not use the assistance information is used, is determined to be performed;

assisted GPS position measuring at which, when the assisted GPS position measuring is determined to be performed at the step of determining GPS position measuring, the assisted GPS position measuring is performed; and autonomous GPS position measuring at which, when the autonomous GPS position measuring is determined to be performed at the step of determining GPS position measuring, the autonomous GPS position measuring is performed.

In this position measuring method, first of all, at the step of determining GPS position measuring, one of the assisted GPS position measuring and the autonomous GPS position measuring is determined to be performed. In this case, the assisted GPS position measuring means a position measuring in which the assistance information which includes the information for capturing a GPS satellite is used, and in which, the assistance information when necessary, is acquired from the location information server which holds the assistance information. Moreover, the autonomous GPS position measuring means a position measuring in which a GPS satellite which does not use the assistance information is used.

Next, at the step of determining GPS position measuring, when the assisted GPS position measuring is determined to be performed, at the step of assisted GPS position measuring, the assisted GPS position measuring is performed. On the other hand, when the autonomous GPS position measuring is determined to be performed, at the step of autonomous GPS position measuring, the autonomous GPS position measuring is performed. Consequently, in the method for position measuring of the present invention, it is possible to select any one of the assisted GPS position measuring and the autonomous GPS position measuring.

Moreover, in the method for position measuring of the present invention, when an environment is such that a data communication is not possible in the environment, at the step of determining GPS position measuring, the autonomous GPS position measuring is determined to be performed. In this case, in the environment where the data communication is not possible, it is possible to select the autonomous GPS position measuring in which the position measuring is possible without performing the data communication.

Moreover, the method for position measuring of the present invention, can further comprise a step of supplementary autonomous GPS position measuring at which, when the assisted GPS position measuring has failed at the step of assisted GPS position measuring, when a reason for the failure is a predetermined reason, the autonomous GPS position measuring is performed. In this case, when the step of assisted GPS position measuring has failed, and when the reason for the failure is a predetermined reason, it is possible to perform further the autonomous GPS position measuring. Consequently, when the position measuring by the assisted GPS position measuring method has failed, it is possible to select further the position measuring by the autonomous GPS position measuring method.

Moreover, it is possible to let the predetermined reason to include a reason caused by the location information server. Accordingly, when the assisted GPS position measuring has failed due to the location information server, it is possible to select the autonomous GPS position measuring in which at least the failure due to the same reason does not occur.

Moreover, the method for position measuring, can further comprise steps of:

determining a specified position measuring method at which, when a request for position measuring is received, when a position measuring method specified is a cell ID position measuring in which location information of a cell in a range of which the mobile communication terminal exists is acquired, the cell ID position measuring is determined to be performed, and in any one of two cases namely a case in which the position measuring method specified is a GPS position measuring which includes the assisted GPS position measuring and the autonomous GPS position measuring, and a case in which the position measuring method is not specified, the GPS position measuring is determined to be performed; and a cell ID position measuring at which, when the cell ID position measuring is determined at the step of specified position measuring method, the cell ID position measuring is performed; and when the GPS position measuring is determined to be performed at the step of determining the specified position measuring method, the step of determining GPS position measuring is executed.

In this case, at the step of determining the specified position measuring method, when the position measuring method specified is the cell ID position measuring, the cell ID position measuring is determined to be performed, and when the position measuring method specified is the GPS position measuring, and when the position measuring method is not specified, the GPS position measuring method is determined to be performed. In this case, the cell ID position measuring means a position measuring in which the location information of a cell in the range of which the mobile communication terminal exists is acquired, and the GPS position measuring means a GPS position measuring which includes the assisted GPS position measuring and the autonomous GPS position measuring.

Next, at the step of determining specified position measuring method, when the cell ID position measuring is determined to be performed, at the step of cell ID position measuring, the cell ID position measuring is performed. On the other hand, when the GPS position measuring is determined to be performed, the step of determining GPS position measuring is performed. Consequently, in the method for position measuring of the present invention, when it is possible to select the cell ID position measuring method, and when the position measuring method is not specified, it is possible to select the GPS position measuring which is a highly accurate position measuring.

Moreover, in the method for position measuring of the present invention, at the step of determining the specified position measuring method, when the position measuring method specified is a base station radio waves position measuring at which a location is measured by detecting radio waves from a plurality of base stations, the base station radio waves position measuring can be let to be determined to be performed. In this case, the method of "measuring the location by detecting radio waves from the base station" means a method for position measuring in which a method such as a so called OTDOA (Observed Time Difference Of Arrival) of measuring a location by calculating a distance from the base station by detecting an arrival time of radio waves from the base station. In this case, accuracy higher than accuracy in the cell ID position measuring is required. However, when accuracy not as of a level in the GPS position measuring is required, it is possible to select the base station radio waves position measuring.

Furthermore, the method for position measuring of the present invention, can further comprise a step of supplementary cell ID position measuring at which, in a case in which the assisted GPS position measuring at the step of assisted GPS position measuring has failed, when at the step of assisted GPS position measuring, the location information of the cell in the range of which the mobile communication terminal exists, is acquired, a supplementary cell ID position measuring in which the location information is used, is performed.

In this case, when the assisted GPS position measuring at the step of assisted GPS position measuring has failed, and when at the step of assisted GPS position measuring, the location information of the cell in the range of which the mobile communication terminal exists, is acquired, the supplementary cell ID position measuring is performed. The supplementary cell ID position measuring means a position measuring in which the location information of the cell in the range of which the mobile communication terminal exists is acquired is used. Consequently, when the position measuring by the assisted GPS position measuring has failed, it is possible to select further the position measuring by the supplementary cell ID position measuring method.

From a second viewpoint of the present invention, a mobile communication terminal comprises: a position measuring method determining means which determines a position measuring method which includes determining to perform one of an assisted GPS position measuring which is a position measuring in which assistance information which includes information for capturing a GPS satellite is used, and in which, the assistance information when necessary, is acquired from a location information server which holds the assistance information, and an autonomous GPS position measuring which is a position measuring in which a GPS satellite which does not use the assistance information is used; an assisted GPS position measuring means which performs the assisted GPS position measuring; and an autonomous GPS position measuring means which performs the autonomous GPS position measuring.

In this mobile communication terminal, when there is a request from an application and so forth, the position measuring method determining means determines to perform any one of the assisted GPS position measuring and the autonomous GPS position measuring. In this case, when the assisted GPS position measuring is determined to be performed, the assisted GPS position measuring means performs the assisted GPS position measuring, and when the autonomous GPS position measuring is determined to be performed, the autonomous GPS position measuring means performs the autonomous GPS position measuring. Consequently, in the mobile communication terminal of the present invention, according to the request from the application and so forth, it is possible to select any one of the assisted GPS position measuring method and the autonomous GPS position measuring method.

In this case, the position measuring method determining means, when has received a request for position measuring, can determine to perform the GPS position measuring method, in one of cases namely a case in which the GPS position measuring which includes the assisted GPS position measuring and the autonomous GPS position measuring is specified, and a case in which the position measuring method is not specified. Consequently, in the mobile communication terminal of the present invention, according to the request from the application and so forth, it is possible to select the position measuring method, and when the position measuring method is not specified, it is possible to select the GPS position measuring which is a highly accurate position measuring.

Moreover, the position measuring method determining means which, when the assisted GPS position measuring by the assisted GPS position measuring means is failed with a reason for the failure is a predetermine reason, can determine to perform the autonomous GPS position measuring. In this case, when the position measuring by the assisted GPS position measuring method has failed, it is possible to select further the position measuring by the autonomous GPS position measuring method.

Furthermore, the mobile communication terminal of the present invention further comprises:
a cell ID position measuring means which performs a cell ID position measuring which is a position measuring in which location information of a cell in a range of which the mobile communication terminal exists is acquired, and the position measuring method determining means, when a request for position measuring is received, can further determine to perform the cell ID position measuring. In this case, the position measuring method determining means performs the cell ID position measuring when a judgment that the cell ID position measuring is specified, is made. Consequently, in the mobile communication terminal of the present invention, according to the request from the application and so forth, it is possible to select the cell ID position measuring method.

The mobile communication terminal of the present invention further comprises
a supplementary cell ID position measuring means which performs a supplementary cell ID position measuring which is a position measuring in which location information of a cell in a range of which the mobile communication terminal exists, acquired by the assisted GPS position measuring means is used, and the position measuring method determining means which, when the assisted GPS position measuring by the assisted GPS position measuring means has failed, and when the location information is acquired, further performs the supplementary cell ID position measuring.

In this case, the position measuring method determining means, when the assisted GPS position measuring by the assisted GPS position measuring means has failed, and when the location information of the cell in which the mobile communication terminal exists is acquired, performs the supplementary cell ID position measuring. Consequently, when the position measuring by the assisted GPS position measuring method has failed, it is possible to further select the position measuring by the supplementary cell ID position measuring method.

Moreover, the mobile communication terminal of the present invention further comprises: a base station radio waves position measuring means which performs a base station radio waves position measuring in which a location is measured by detecting radio waves from a plurality of base stations; and when the request for position measuring is received, the position measuring method determining means, can further determine to perform the base station radio waves position measuring, when the position measuring method specified is the base station radio waves position measuring.

As it has been described above, according to a method for position measuring of the present invention, there is shown an effect that it is possible to select a position measuring method, and when a position measuring by the selected position measuring method has failed, it is possible to select position measuring by still another position measuring method.

Moreover, according to a mobile communication terminal of the present invention, there is shown an effect that it is possible to select a position measuring method, and when a position measuring by the selected position measuring method has failed, it is possible to select position measuring by still another position measuring method.

DETAILED DESCRIPTION

An embodiment of the present invention will be described below while referring to FIG. 1 to FIG. 7.

Figure 1:
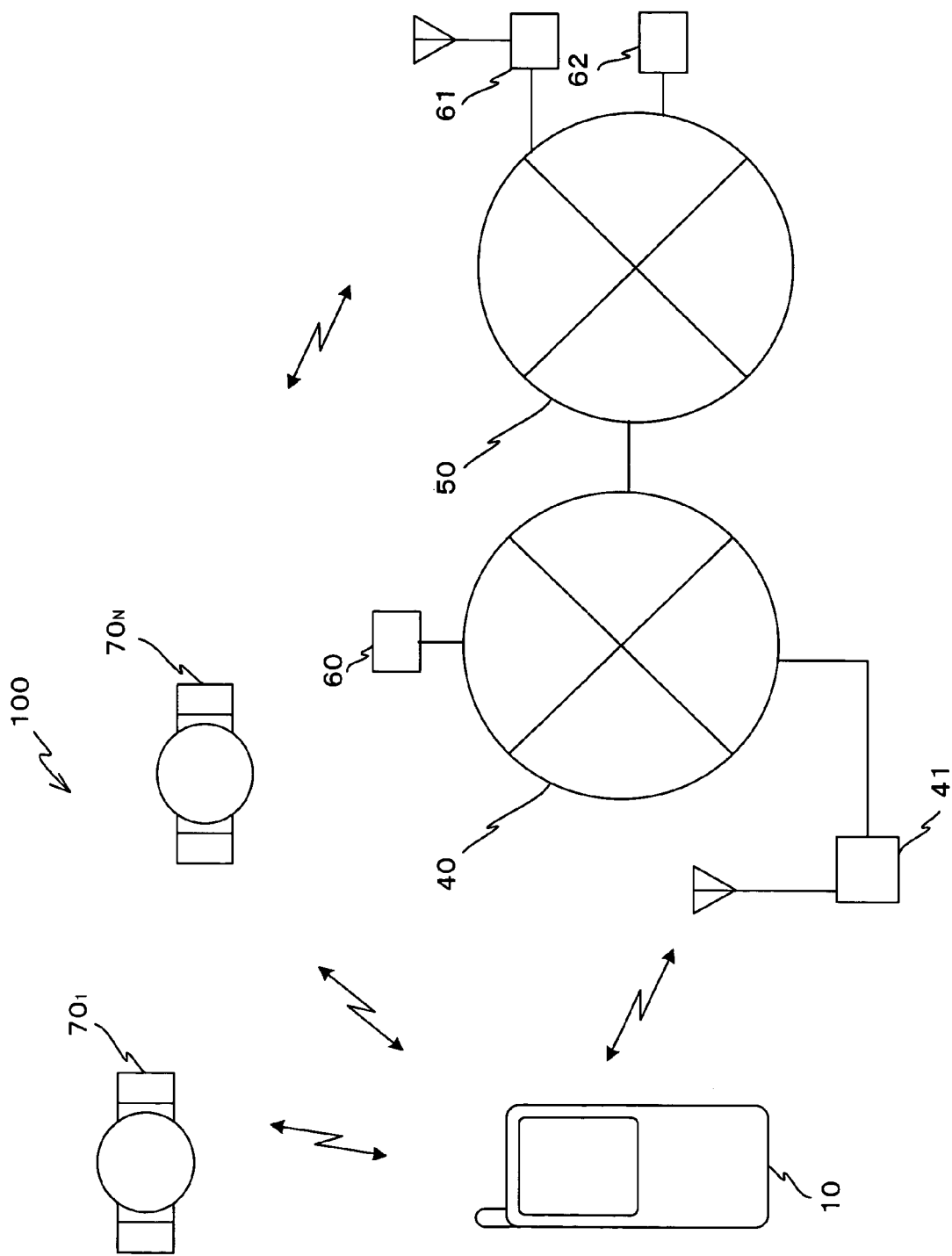
FIG. 1 is a diagram showing schematically a position measuring system according to an embodiment.

A configuration of a position measuring system 100 according to the embodiment of the present invention is shown schematically in FIG. 1. This position measuring system 100 includes (i) a cellular phone 10 as a mobile communication terminal, (ii) a base station 41 which performs a wireless communication with the cellular phone 10, (iii) a GPS satellite $70_j$ (j=1 to N) which transmits to the cellular phone 10 a wireless signal for a GPS position measuring, (iv) a wireless access network 40 (RAN) which performs a wireless access control when the cellular phone 10 performs communication via the base station 41, (v) a network 50 which is connected to the wireless access network 40, and to which a server for providing various services is connected, (vi) a wireless network control unit 60 (RNC) which is connected to the network 40, and which registers location information of a cell in which the cellular phone (10) exists, and performs management of the information registered, (vii) a location information server 61 (SMLC) connected to the network 50, which holds assistance information which includes information for performing communication with the GPS satellite $70_j$, information for the cellular phone 10 to capture the GPS satellite $70_j$, as well as holds location information of the cell in which the cellular phone 10 exists, and (viii) a location information gateway 62 (GMLC) which is connected to the network 50, and which is a server apparatus for making a query of whether the location information server 61 can be used when the cellular phone 10 performs the assisted GPS position measuring.

In this embodiment, for the cellular phone 10 to perform the GPS position measuring, since it is necessary to receive a signal from a plurality of GPS satellites, N in the GPS satellite $70_j$ (j=1 to N) is normally a plural number. Moreover, the base stations 41 which can perform the wireless communication with the cellular phone 10 are normally in plurality, and in FIG. 1 one of the base stations 41 is shown as a representative.

Figure 2A:
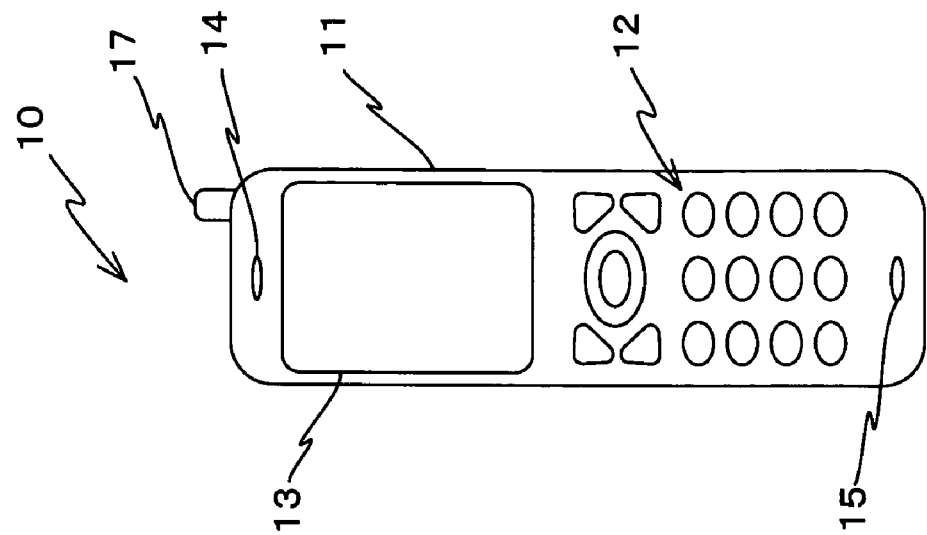
FIG. 2A is a diagram showing schematically a front view of a cellular phone 10 in FIG. 1.
Figure 2B:
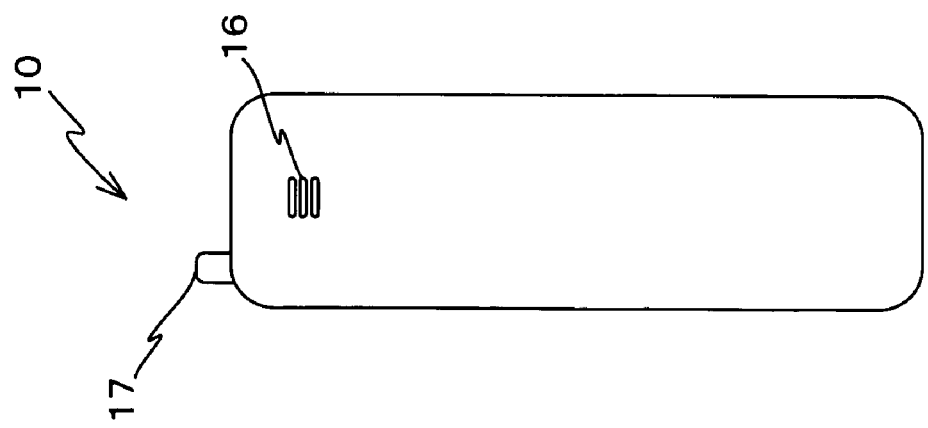
FIG. 2B is a diagram showing schematically a rear view of the cellular phone 10 in FIG. 1.

In FIG. 2A and FIG. 2B, the cellular phone 10 which is the mobile communication terminal is shown schematically. In this embodiment, in FIG. 2A, an external front view of the cellular phone 10 is shown, and in FIG. 2B an external rear view of the cellular phone 10 is shown.

As it is shown in FIG. 2A and FIG. 2B, the cellular phone 10 includes (a) a cellular phone main body 11, (b) an operating panel 12 which includes a numerical keypad for inputting telephone numbers, and function keys for inputting various commands such as switching of operation mode, to a control section 21 (refer to FIG. 3), (c) a display section 13 having a liquid crystal display apparatus which displays operation instructions, operation status, and a message received and so forth, (d) a speaker for conversation 14 which reproduces an aural signal transmitted from a communication counterpart during conversation, (e) a microphone 15 for inputting sound during listening, and inputting voice during conversation, (f) a speaker for instructions 16 for generating a sound informing an incoming call and an instruction sound, and (g) an antenna 17 for transferring a wireless signal to and from the base station.

Figure 3:
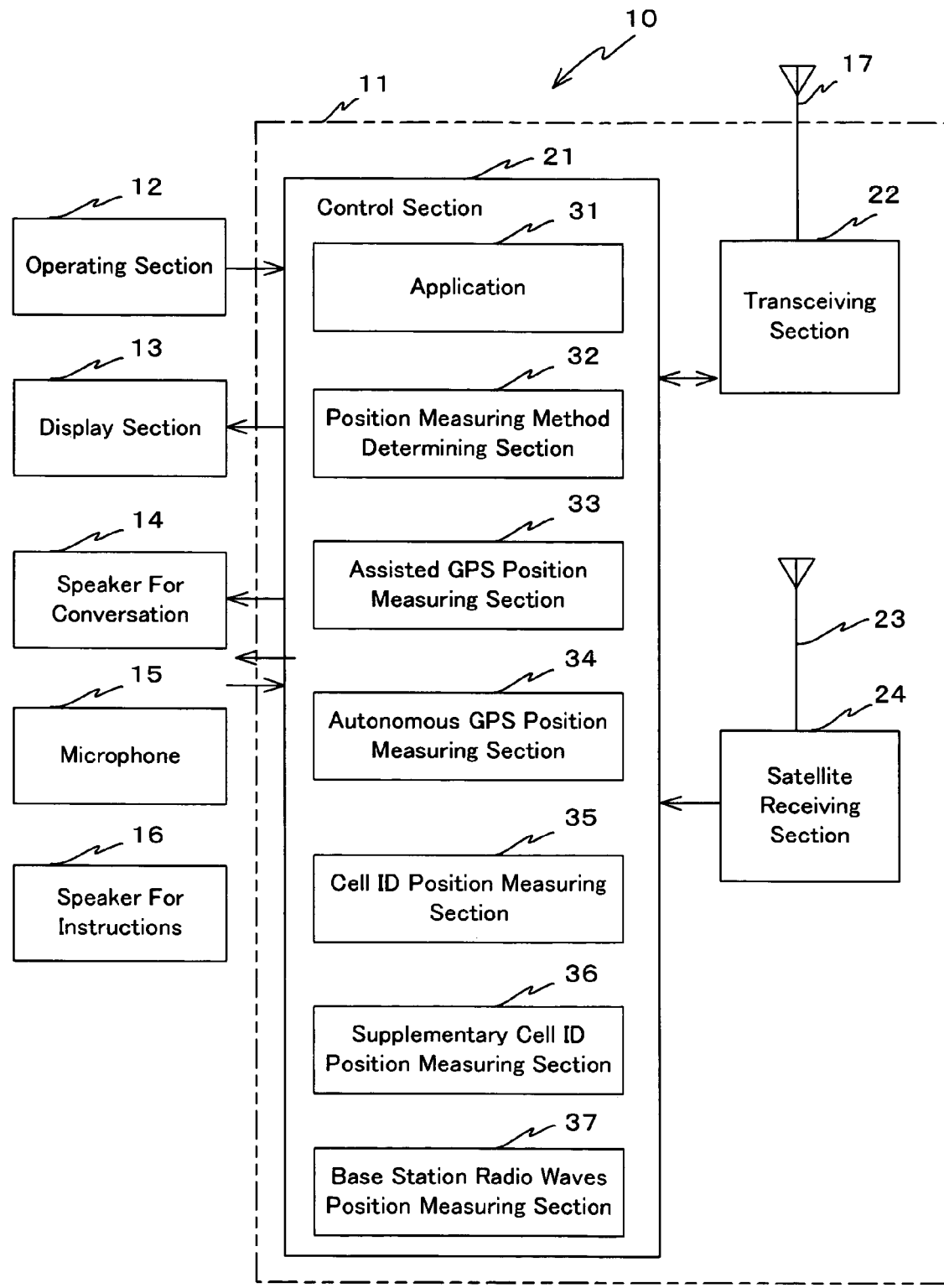
FIG. 3 is a functional block diagram for describing an internal configuration of the cellular phone 10 in FIG. 1.

As shown in FIG. 3, an inside of the cellular phone main body 11 is provided with (h) a control section 21 which performs an integrated control of operations of the cellular phone 10, (i) a transceiving section 22 which performs a wireless communication via the antenna 17, (j) a GPS antenna 23 which receives a wireless signal from a GPS satellite, and (k) a satellite-wave receiving section 24 which processes a signal received, via the GPS antenna 23.

In this embodiment, the control section 21 includes (i) an application 31 which displays a position measuring accuracy of location information of which position is measured, as well as provides a service in which the location information is used, (ii) a position measuring method determining section 32 which determines the position measuring method, (iii) an assisted GPS position measuring section 33 which, when necessary acquires the assistance information via the antenna 17 and the transceiving section 22, and performs an assisted GPS position measuring by using the GPS antenna 23 and the satellite receiving section 24, (iv) an autonomous GPS position measuring section 34 which performs an autonomous GPS position measuring by using the GPS antenna 23 and the satellite receiving section 24, (v) a cell ID position measuring section 35 which performs a communication with the base station via the antenna 17 and the transceiving section 22, and performs a cell ID position measuring, (vi) a supplementary cell ID position measuring section 36 which performs a supplementary cell ID position measuring when the assisted GPS position measuring has failed, and (vii) a base station radio waves position measuring section 37 which performs a position measuring by calculating a distance from the base station by detecting an arrival time of radio waves from a plurality of base stations including the base station 41, by using the transceiving section 22 and the antenna 17.

Note that, in this embodiment, the control section 21 includes a central processing unit (CPU), a digital signal processor (DSP), and a non-volatile storage apparatus and a volatile storage apparatus, and performs an operation control of functions mentioned above. In this embodiment, the application 33, the position measuring method determining section 32, the assisted GPS position measuring section 33, the autonomous GPS position measuring section 34, the cell ID position measuring section 35, and the supplementary cell ID position measuring section 36 are formed by a computer program which is executed in the control section 21. Moreover, the position measuring accuracy which is displayed by the application 31 is displayed as "3" when a position measuring error is less than 50 m, displayed as "2" when the position measuring error is in a range of 50 m to 300 m, and displayed as "1" when the position measuring error is 300 m or more.

A procedure for selecting the position measuring method in the cellular phone 10 will be described below by referring to a screen transition diagram in FIG. 4, and a flowchart in FIG. 5.

Figure 4:
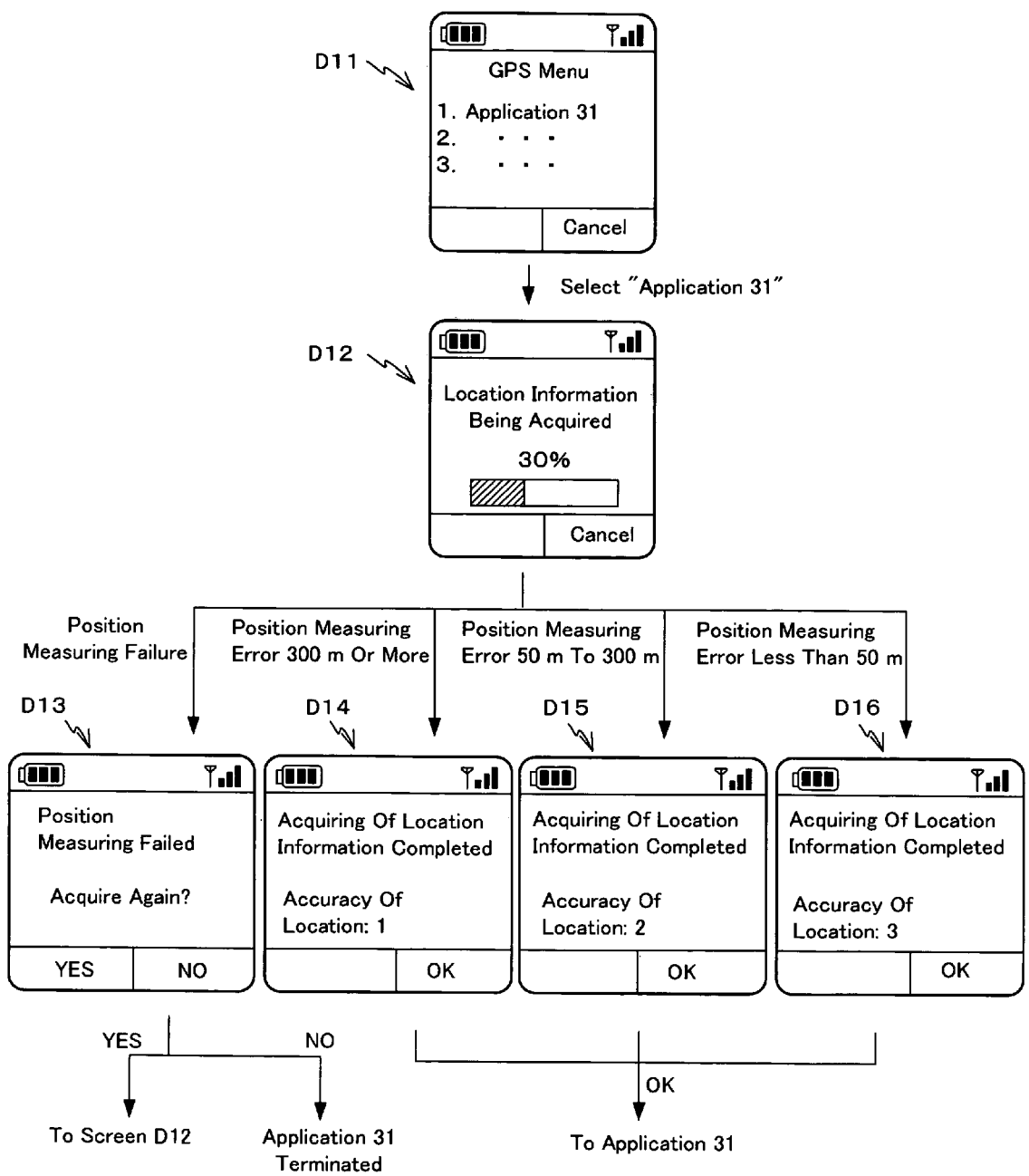
FIG. 4 is a diagram showing a screen transition in a display section 13 of the cellular phone in FIG. 1.

First of all, a user of the cellular phone 10 starts up the application 31 from a screen D11 in FIG. 4 in which a menu of a service in which the location information is used is displayed, by operating the operating section 12. The application 31 makes a request for position measuring a current location to the position measuring method determining section 32, for providing a service according to a current position of the user. The application 31 which has received the request for position measuring, displays a progress of a current location acquisition on a screen D12 in FIG. 4.

Figure 5:
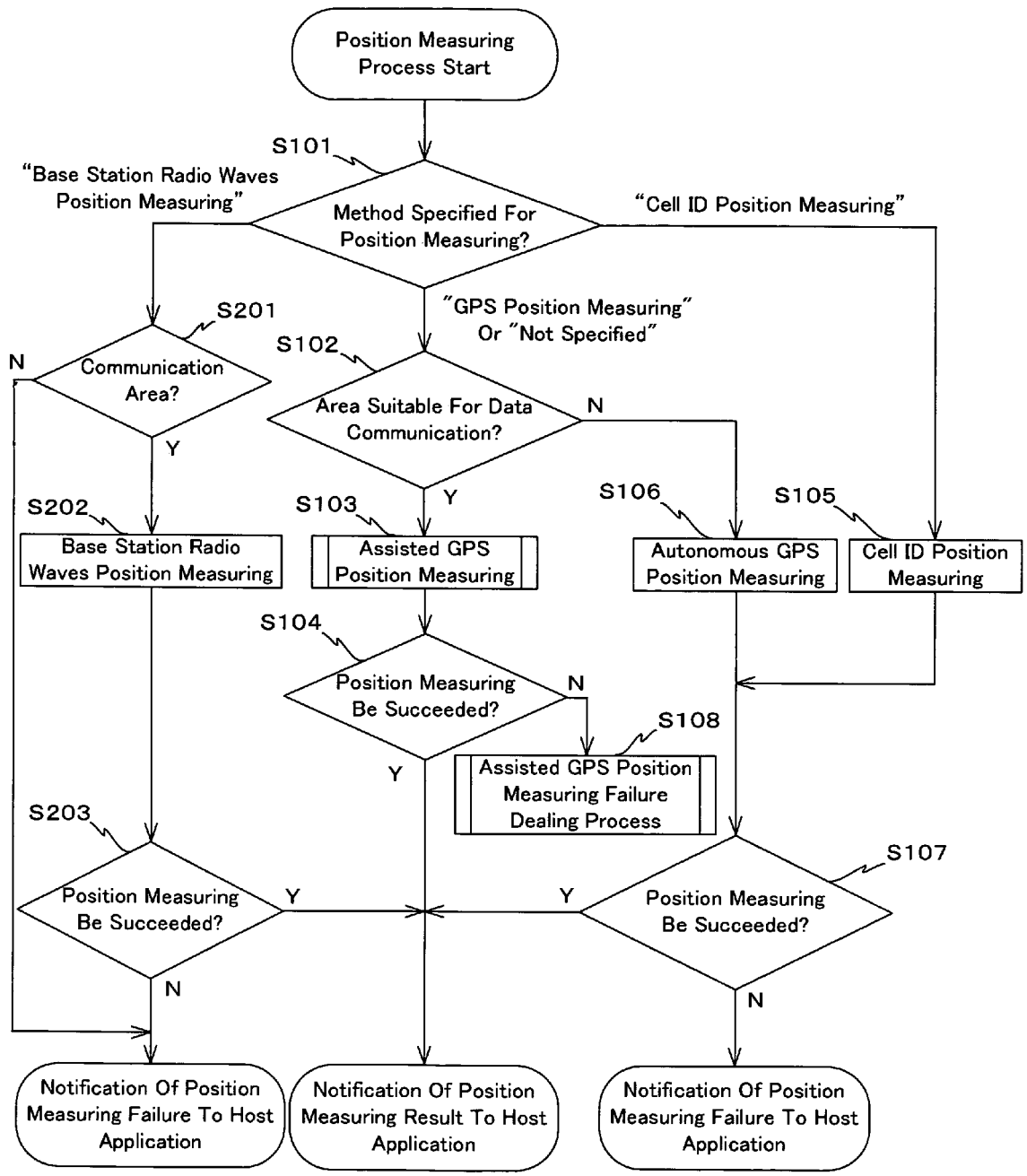
FIG. 5 is a flowchart for describing a method for position measuring in the position measuring system in FIG. 1.

The position measuring method determining section 32 which has received the request for position measuring confirms checks a specified position measuring method at step S101 shown in FIG. 5. In this embodiment, the specified position measuring method is let to be a position measuring method which is specified by the application 31, and stored in a storage apparatus which is not shown in the diagram, in the control section 21, and the position measuring method determining section 32 checks the specified position measuring method by reading from the storage apparatus.

At step S101, when the position measuring method determining section 32 has confirmed that the specified position measuring method is a "cell ID position measuring", the process is advanced to step S105, and the position measuring method determining section 32 makes a request for the cell ID position measuring to the cell ID position measuring section 35. The cell ID position measuring section 35 which has received the request for the cell ID position measuring, makes a request for location information of a cell in which the cellular phone 10 exists, to the wireless network control unit 60 via the transceiving section 22, the antenna 17, the base station 41, and the wireless access network 40, and acquires the location information from the wireless network control section 60.

A result of the cell ID position measuring is notified to the position measuring method determining section 32 by the cell ID position measuring section 35, and at step S107, the position measuring method determining section 32 checks whether or not the position measuring has succeeded. When the cell ID position measuring has succeeded, the position measuring method determining section 32 notifies the location information which is a result of position measuring, to the application 31. The application 31 displays screens D14 to D16 in FIG. 4 which show that the accuracy of the location is in a range of 1 to 3, according to the position measuring error of the cell ID position measuring. When the user selects OK by operating the operating section 12, the application 31 provides to the user a service based on the location information. Moreover, when the cell ID position measuring has failed, the position measuring method determining section 32 notifies a position measuring failure to the application 31. The application 31 to which the position measuring failure is notified, displays a screen D13 in FIG. 4, which shows that it is a position measuring failure, and induces the user to select whether to acquire the location once again. In this embodiment, when the user has selected to acquire the location one again, the screen D12 is displayed, and a position measuring process in FIG. 5 is started. Moreover, when the user has selected not to acquire the location again, the application 31 is terminated.

Furthermore, at step S101, when the position measuring method determining section 32 has confirmed that the specified position measuring method is a "base station radio waves position measuring", the process is advanced to step S201, and a judgment of whether an area in which the cellular phone exists is located in a communication area is made. In this embodiment, the communication area may be a data communication area or an area only for communication. When a negative judgment is made at step S201, the position measuring method determining section 32 notifies the position measuring failure to the application 31. The application 31, similarly as in the case of the position measuring failure of the cell ID position measuring, displays the screen D13 in FIG. 4, and induces the user to select whether to acquire the location once again. In this embodiment, when the user has selected to acquire the location once again, the screen D12 is displayed and the position measuring process is started. When the user has selected not to acquire the location once again, the application 31 is terminated.

On the other hand, when an affirmative judgment is made at step S201, the process is advanced to step S202, and the position measuring method determining section 32 makes a request for the base station radio waves position measuring to the base station radio waves position measuring section 37. The base station radio waves position measuring section 37 which has received the request for the base station radio waves position measuring, measures a location by calculating a distance from the base station by detecting an arrival time of radio waves from the plurality of base stations including the base station 41, by using the transceiving section 22 and the antenna 17.

A result of the base station radio waves position measuring is notified to the position measuring method determining section 32 by the base station radio waves position measuring section 37, and the position measuring method determining section 32, at step S203, checks whether the position measuring has succeeded. When the base station radio waves position measuring has succeeded, the position measuring method determining section 32 notifies location information which is a result of position measuring, to the application 31. The application 31 displays the screens D14 to D16 in FIG. 4, which show that the accuracy of the location is in the range of 1 to 3, according to a position measuring error of the base station radio waves position measuring. When the user selects OK by operating the operating section 12, the application 31 provides to the user a service based on the location information. On the other hand, when the base station radio waves position measuring has failed, the position measuring method determining section 32 notifies the position measuring failure to the application 31. The application 31, similarly as when the cell ID position measuring has failed, displays the screen D13 in FIG. 4, and induces the user to select whether to acquire the location once again. In this embodiment, when the user has selected to acquire the location once again, the screen D12 is displayed, and the position measuring process is started. When the user has selected not to acquire the location once again, the application 31 is terminated.

Moreover, at step S101, when the position measuring method determining section 32 has checked that the specified position measuring method is a "GPS position measuring" or "not specified", the process is advanced to step S102, and a judgment of whether an area in which the cellular phone (10) exists is an area suitable for data communication is made. When a negative judgment is made at step S102, the process is advanced to step S106, and the position measuring method determining section 32 makes a request for an autonomous GPS position measuring to the autonomous GPS position measuring section 34.

The autonomous GPS position measuring section 34 which has received the request for the autonomous GPS position measuring performs the autonomous GPS position measuring by using the GPS antenna 23 and the satellite receiving section 24. A result of the autonomous GPS position measuring is notified to the position measuring method determining section 32 by the autonomous GPS position measuring section 34, and the position measuring method determining section 32, at step S107, checks whether the position measuring has succeeded.

Similarly as in the case of the cell ID position measuring, when the position measuring has succeeded, location information which is a result of position measuring is notified to the application 31. The application 31 displays the screens D14 to D16 in FIG. 4, which show that the accuracy of the location is in the range of 1 to 3, according to a position measuring error of the autonomous GPS position measuring. When the user selects OK by operating the operating section 12, the application 31 provides to the user a service based on the location information. On the other hand, when the position measuring has failed, the position measuring method determining section 32 notifies the position measuring failure to the application 31. The application 31 to which the position measuring failure is notified, similarly as in the position measuring failure in the other position measuring method, displays the screen D13, and induces the user to select whether to acquire the location once again. In this embodiment, when the user has selected to acquire the location once again, the screen D12 is displayed, and the position measuring process is started. When the user has selected not to acquire the location once again, the application 31 is terminated.

Figure 6:
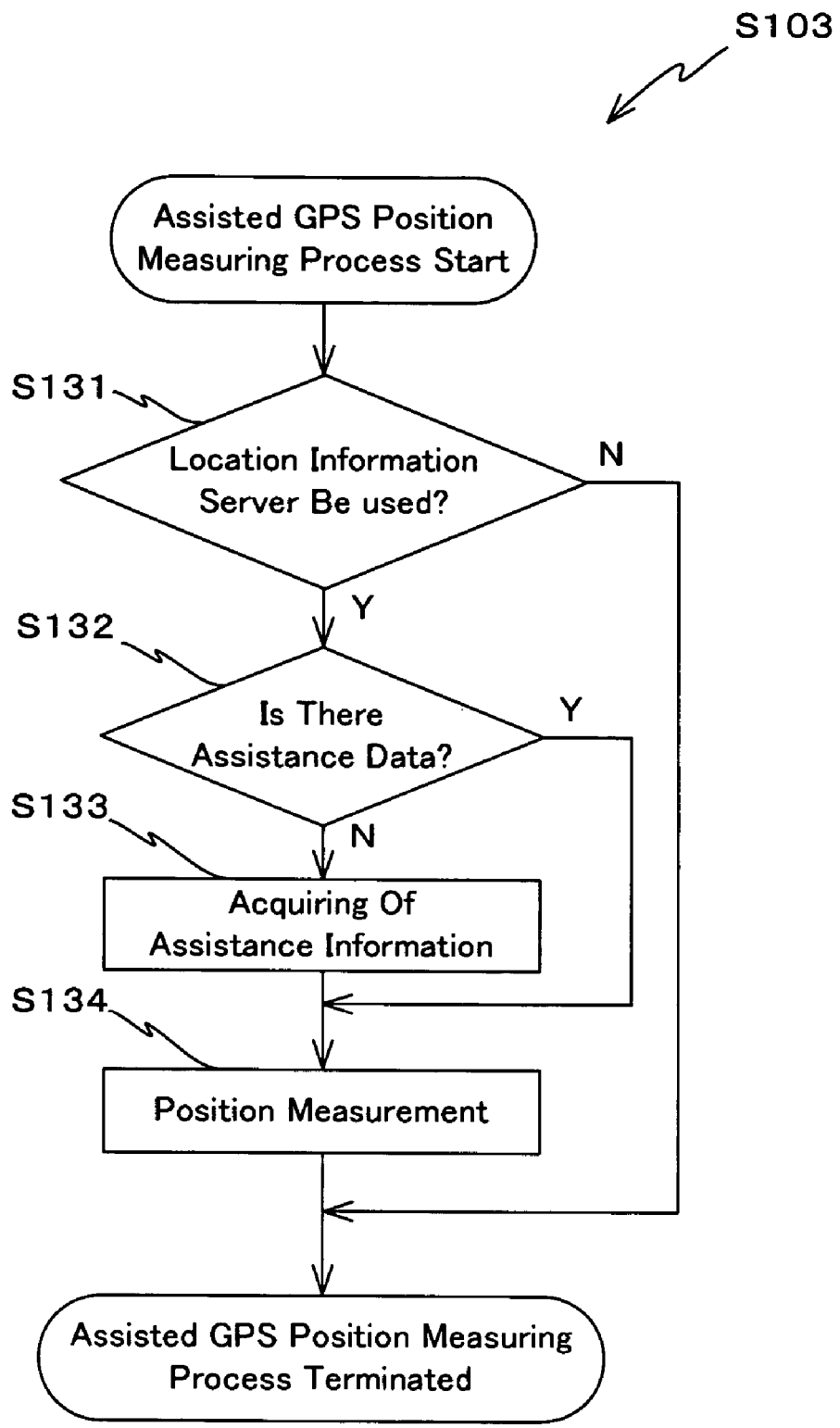
FIG. 6 is a flowchart for describing an assisted GPS position measuring process, from among methods for position measuring in the position measuring system in FIG. 1.

On the other hand, when an affirmative judgment is made at step S102, the process is advanced to step S103, and a request for the assisted GPS position measuring is made to the assisted GPS position measuring section 33. The assisted GPS position measuring section 33 which has received the request for the assisted GPS position measuring, as shown in FIG. 6, at step S131, makes a query of whether it is possible to use the location information server 61, to the location information gateway 62 via the transceiving section 22, the antenna 17, the base station 41, the wireless access network 40, and the network 50.

The assisted GPS position measuring section 33 which has received a result of the query makes a judgment of whether the result is that it is possible to use the location information server 61. When this judgment is negative, the assisted GPS position measuring section 33 notifies that the assisted GPS position measuring has failed together with a cause of the failure, to the position measuring method determining section, and the assisted GPS position measuring is terminated. On the other hand, when the judgment is affirmative, at step S132, a judgment of whether there is assistance information which is effective for performing the assisted GPS position measuring, in a storage apparatus of the control section 21 is made.

When the assisted GPS position measuring section 33 has made a judgment that the effective information is there in the storage apparatus of the control section 21, at step S134, a location measurement is performed by using the GPS antenna 23 and the satellite receiving section 24, by using the assistance information. On the other hand, when a judgment that the effective assistance information is not there is made, at step S133, the assisted GPS position measuring section 33 makes a request for the assistance information, to the location information server 61 via the transceiving section 22, the antenna 17, the base station 41, the wireless access network 40, and the network 50, and acquires the assistance information from the location information server 61. When the assistance information if acquired, location information of a cell in which the cellular phone 10 exists, and which is stored in the location information server 61 is also acquired. Next, the assisted GPS position measuring section 33 which has acquired the assistance information, at step S134, performs the location measurement by using the GPS antenna 23 and the satellite receiving section 24, by using the assistance information.

When the assisted GPS position measuring section 33 terminates the location measurement, a result of the measurement together with a cause of the failure, when the measurement is failed, is notified to the position measuring method determining section 32, and the assisted GPS position measuring process is terminated. Coming back to FIG. 5, at step S104, the position measuring method determining section 32 to which the position measuring result is notified, checks whether the position measuring has succeeded. When the assisted GPS position measuring has succeeded, the position measuring method determining section 32 notifies the location information which is a position measuring result, to the application 31. The application 31 displays the screens D14 to D16 in FIG. 4, which show that the accuracy of the location is in the range of 1 to 3, according to a position measuring error of the assisted GPS position measuring. When the user selects OK by operating the operating section 12, the application provides to the user a service based on the location information. On the other hand, when the assisted GPS position measuring has failed, the process is advanced to step S108 process to deal with failure of assisted GPS position measuring.

Figure 7:
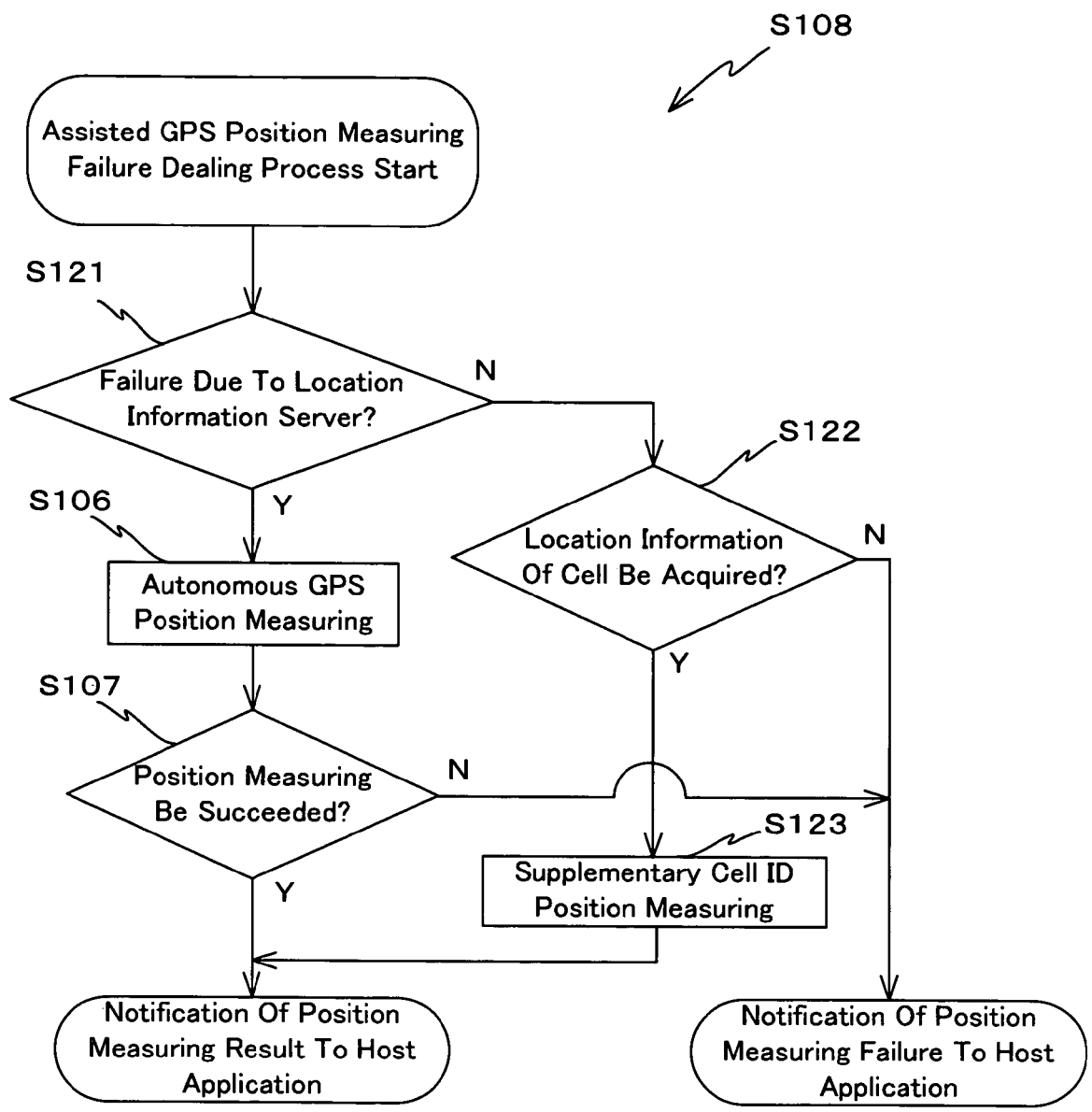
FIG. 7 is a flowchart for describing the assisted GPS position measuring failure process, from among the methods for position measuring in the position measuring system in FIG. 1.

In process to deal with failure of assisted GPS position measuring at step S108, as shown in FIG. 7, first of all, at step S121, the assisted GPS position measuring section 33 makes a judgment of whether it is a failure caused by the location information server 61. In this embodiment, the failure caused by the location information server 61 means that at step S131, a use of the location information server 61 is checked from the location information gateway 62, and when a result of the checking is that the location information server 61 cannot be used, a reason for this is a lack of resources and a malfunction of the location information server 61.

When the judgment is affirmative, the process is moved to step S106, and the position measuring method determining section 32 makes a request for the autonomous GPS position measuring in which the assistance information is not used, to the autonomous GPS position measuring section 34. The autonomous GPS position measuring section 34, similarly as at step S106 in FIG. 5, performs the autonomous GPS position measuring, and notifies a position measuring result to the position measuring method determining section 32. The position measuring method determining section 32 to which the position measuring result is notified, at step S107, checks whether the position measuring has succeeded. When the position measuring has succeeded, the position measuring method determining section 32 notifies the location information which is a position measuring result, to the application 31. The application 31 displays the screens D14 to D16 in FIG. 4, which show that the accuracy of the location is in the range of 1 to 3, according to a position measuring error of the autonomous GPS position measuring. When the user selects OK by operating the operating section 12, the application 31 provides to the user a service based on the location information. On the other hand, when the position measuring has failed, the position measuring method determining section 32 notifies the position measuring failure to the application 31. The application 31, similarly as in the position measuring failure in other position measuring methods, displays the screen D13, and induces the user to select whether to acquire the location once again. In this embodiment, when the user has selected to acquire the location once again, the screen D12 is displayed, and a position measuring process is started. When the user has selected not to acquire the location once again, the application 31 is terminated.

On the other hand, when the cause of the failure is such as radio waves from the GPS satellite could not be received, and the assistance information could not be acquired, when a negative judgment is made at step S121 in FIG. 7, the step is advanced to step S122, and the position measuring method determining section 32 checks whether at step S133, the cellular phone 10 has acquired in the storage apparatus of the control section 21 the assistance information together with a location information of the cell acquired. When the cause of the failure is a cause which has occurred in the location measurement at step S134 such as the radio waves from the GPS satellite could not be received, the location information of the cell is acquired at the time of acquiring the assistance information at step S133.

At step S122, when it is not possible to check that the location information of the cell has been acquired, the position measuring method determining section 32 notifies a position measuring failure to the application 31. The application 31 to which the position measuring failure is notified, similarly in the case of the position measuring failure in other position measuring methods, displays the screen D13 in FIG. 4, and induces the user to select whether to acquire the location once again. In this embodiment, when the user has selected to acquire the location once again, the screen D12 is displayed, and the position measuring process is started. When the user has selected not to acquire the location once again, the application 31 is terminated. On the other hand, at step S122, when it is checked that the location information of the cell has been acquired, the position measuring method determining section 32 makes a request to the supplementary cell ID position measuring section 36, for a supplementary cell ID position measuring which is a position measuring in which the location information is used. The supplementary cell ID position measuring section 36 which has received the request for the supplementary cell ID position measuring acquires the location information from the storage apparatus of the control unit 21, and notifies to the application 31. The application 31 displays the screens D14 to D16 in FIG. 4, which show that the accuracy of the location is in the range of 1 to 3, according to a position measuring error of the supplementary cell ID position measuring. When the user selects OK by operating the operating section 12, the application 31 provides to the user a service based on the location information.

As it has been described above, in this embodiment, when the application of the cellular phone 10 makes a request for position measuring of a current location for providing a service according to the current location, first of all, the position measuring method determining section 32 checks the position measuring method. When the position measuring method which is checked is the "cell ID position measuring", the cell ID position measuring is performed, and when the position measuring method confirmed is the "base station radio waves position measuring", the base station radio waves position measuring is performed. On the other hand, when the position measuring method checked is the "GPS position measuring" or "not specified", a judgment of whether the area in which the cellular phone 10 is located is an area suitable for the data communication is made.

When the judgment of whether the area is suitable for the data communication is negative, the autonomous GPS position measuring is performed. On the other hand, when the judgment of whether the area is suitable for the data communication is affirmative, the assisted GPS position measuring is performed. In this embodiment, when the assisted GPS position measuring has failed, further a judgment of whether the failure is due to the location information server 61 is made. When this judgment is affirmative, the autonomous GPS position measuring is performed. On the other hand, when the judgment is negative, further, a judgment of whether the location information of the cell is acquired in the assisted GPS position measuring is made. When this judgment is affirmative, the supplementary cell ID position measuring is performed. When the judgment is negative, a position measuring failure is notified to the application.

Consequently, according to this embodiment, it is possible to select the position measuring method, as well as to select a position measuring by still another position measuring method when the position measuring by the selected position measuring method has failed.

In this embodiment, the specified position measuring method is specified in advance by the application 31. However, the specified position measuring method may be specified in advance by the user, or may be specified by the user at the time of making a request for position measuring.

Moreover, in this embodiment, types of the specified position measuring method are let to be the "cell ID position measuring", the "base station radio waves position measuring", the "GPS position measuring", and "not specified". However, it is needless to mention that any one of the "autonomous GPS position measuring" and the "assisted GPS position measuring" can be used even when specified directly.

Furthermore, in this embodiment, in the "base station radio waves position measuring", the arrival time of the radio waves is let to be detected. However, the position measuring may also be performed by detecting an intensity and so forth of the radio waves.

In this embodiment, the wireless network control unit 60, the location information server 61, and the location information gateway 62 are let to be separate server units. However, it may be the same server unit having three functions, or from among the three server units, two server units may be let to be the same server unit.

Moreover, in this embodiment, the wireless access network 40 and the network 50 are let to be separate networks. However, the wireless access network 40 and the network 50 may be let to be the same network.

Furthermore, in this embodiment, a cellular phone is used as a mobile communication terminal. However, it is needless to mention that this embodiment is also applicable to a mobile communication terminal other than the cellular phone.

As it has been described above, a position measuring method of the present invention is applicable to a mobile communication terminal which performs a GPS position measuring. Moreover, a mobile communication terminal of the present invention can be used as a mobile communication terminal which is capable of performing the GPS position measuring.

What is claimed is:

1. A method for position measurement which measures a current location at which a mobile communication terminal exists, comprising steps of:

determining GPS position measurement technique, said technique corresponding to one selected from among an assisted GPS position measurement and an autonomous GPS position measurement,
    wherein the assisted GPS position measurement is a position measurement using assistance information which includes information for capturing a GPS satellite, wherein the assistance information, when necessary, is acquired from a location information server which holds the assistance information, and
    wherein the autonomous GPS position measurement is a position measurement using a GPS satellite which does not use the assistance information;
  performing assisted GPS position measurement when said determining corresponds to the assisted GPS position measurement; and
  performing autonomous GPS position measurement when said determining corresponds to the autonomous GPS position measurement;
  the method further comprising steps of:
    determining a specified position measuring technique at which, when a request for position measuring is received, and when a position measuring technique specified is a cell ID position measuring in which location information of a cell in a range of which the mobile communication terminal exists is acquired, the cell ID position measuring is determined to be performed, and moreover, in any one of two cases namely a case in which the position measuring technique specified is a GPS position measurement technique which includes the assisted GPS position measurement and the autonomous GPS position measurement, and a case in which the position measuring technique is not specified, a GPS position measurement is performed; and cell ID position measuring at which, when the cell ID position measuring is determined at the step of determining the specified position measuring technique, the cell ID position measuring is performed, wherein when the GPS position measurement is determined to be performed at the step of determining the specified position measuring technique, the step of determining GPS position measurement technique is executed.

2. The method for position measurement according to claim 1, wherein at the step of determining GPS position measurement technique, when an environment is such that a data communication is not possible in the environment, the autonomous GPS position measurement is performed.

3. The method for position measurement according to claim 1, further comprising a step of:

supplementary autonomous GPS position measurement at which, when the assisted GPS position measurement has failed at the step of performing the assisted GPS position measurement, and when a reason for the failure is a predetermined reason, the autonomous GPS position measurement is performed.

4. The method for position measurement according to claim 3, wherein the predetermined reason includes a reason caused by the location information server.

5. The method for position measurement according to claim 1, wherein at the step of determining the specified position measuring technique, when the position measuring technique specified is a base station radio waves position measuring at which a location is measured by detecting radio waves from a plurality of base stations, the base station radio waves position measuring is performed.

6. The method for position measurement according to claim 1, further comprising a step of:

supplementary cell ID position measuring at which, in a case in which the assisted GPS position measurement at the step of performing the assisted GPS position measurement has failed, when at the step of performing the assisted GPS position measurement, the location information of the cell in the range of which the mobile communication terminal exists, is acquired, a supplementary cell ID position measuring using the location information is performed.

7. A mobile communication terminal comprising:

a position measurement technique determining means which determines a position measurement technique which includes determining to perform one of an assisted GPS position measurement which is a position measurement using assistance information which includes information for capturing a GPS satellite, wherein the assistance information when necessary, is acquired from a location information server which holds the assistance information, and an autonomous GPS position measurement which is a position measurement using a GPS satellite which does not use the assistance information;

an assisted GPS position measuring means which performs the assisted GPS position measurement; and an autonomous GPS position measuring means which performs the autonomous GPS position measurement;

further comprising:

a cell ID position measuring means which performs a cell ID position measurement which is a position measurement acquiring location information of a cell in a range of which the mobile communication terminal exists, wherein when a request for position measurement is received, the position measurement technique determining means further determines to perform the cell ID position measurement when the cell ID position measurement is specified as the position measurement technique, wherein when a request for position measurement has been received that specifies a GPS position measurement which includes the assisted GPS position measurement and the autonomous GPS position measurement, the position measurement technique determining means determines that a GPS position measurement technique will be performed, wherein when a request for position measurement has been received that does not specify the position measurement technique, the position measurement technique determining means determines that a GPS position measurement technique will be performed.

8. The mobile communication terminal according to claim 7, wherein the position measurement technique determining means which, when the assisted GPS position measurement fails, and when a reason for the failure is a predetermined reason, determines that the autonomous GPS position measurement will be performed.

9. The mobile communication terminal according to claim 7, further comprising:

a supplementary cell ID position measuring means which performs a supplementary cell ID position measurement which is a position measurement using location information of a cell in a range of which the mobile communication terminal exists, acquired by the assisted GPS position measuring means is used, wherein the position measurement technique determining means which, when the assisted GPS position measurement has failed, further performs the supplementary cell ID position measurement.

10. The mobile communication terminal according to claim 7, further comprising:

a base station radio waves position measuring means which performs a base station radio waves position measurement in which a location is measured by detecting radio waves from a plurality of base stations, wherein when a request for position measurement is received, and when the position measurement technique specified is the base station radio waves position measurement, the position measurement technique determining means determines to perform the base station radio waves position measurement.

* * * * *